(12) United States Patent
Chen (10) Patent No.: US 12,462,387 B2
(45) Date of Patent: Nov. 4, 2025

(54) WOUND GRADE ASSESSMENT METHOD

(71) Applicant: Chung Shan Medical University, Taichung (TW)

(72) Inventor: Chun-Chia Chen, Taichung (TW)

(73) Assignee: Chung Shan Medical University, Taichung (TW)

( * ) Notice: Subject to any disclaimer, the term of this patent is extended or adjusted under 35 U.S.C. 154(b) by 441 days.

(21) Appl. No.: 18/054,545

(22) Filed: Nov. 11, 2022

(65) Prior Publication Data

US 2023/0351596 A1 Nov. 2, 2023

(30) Foreign Application Priority Data

Apr. 28, 2022 (TW) ................... 111116118

(51) Int. Cl.
*G06K 9/00* (2022.01)
*G06T 7/00* (2017.01)
*G16H 30/40* (2018.01)
*G16H 50/30* (2018.01)

(52) U.S. Cl.
CPC ........... *G06T 7/0014* (2013.01); *G16H 30/40* (2018.01); *G16H 50/30* (2018.01); *G06T 2207/10024* (2013.01); *G06T 2207/20081* (2013.01); *G06T 2207/20084* (2013.01); *G06T 2207/30088* (2013.01)

(58) Field of Classification Search
CPC ......... G06T 7/0014; G06T 2207/10024; G06T 2207/20081; G06T 2207/20084; G06T 2207/30088; G16H 30/40; G16H 50/30; G16H 50/70; G16H 50/20
See application file for complete search history.

(56) References Cited

U.S. PATENT DOCUMENTS

| 2020/0194117 A1* | 6/2020 | Krieger | G16H 30/40 |
| 2021/0244327 A1* | 8/2021 | Kuo | G06V 10/82 |
| 2022/0217287 A1* | 7/2022 | Adiri | A61B 5/0022 |

FOREIGN PATENT DOCUMENTS

| CN | 109843176 A * | 6/2019 | A61B 5/0261 |
| WO | WO-2018217162 A1 * | 11/2018 | A61B 5/0033 |

* cited by examiner

*Primary Examiner* — Xin Jia
(74) *Attorney, Agent, or Firm* — CKC & Partners Co., LLC (57) ABSTRACT

A wound care assessment system includes an image capturing device and a processor. The image capturing device is for capturing a target wound image data of a subject. The processor is signally connected to the image capturing device and includes an image-labeling module, a pre-processing module and a wound grade assessment model. The image-labeling module is for receiving and analyzing the target wound image data output from the image capturing device. The pre-processing module is signally connected to the image-labeling module. The wound grade assessment model is established by an establishing method of wound grade assessment model, and the wound grade assessment model is signally connected to the pre-processing module. The wound grade assessment model is for assessing a pressure injury stage and a wound bed preparation indicator of a wound of the subject corresponding to the target wound image data.

6 Claims, 5 Drawing Sheets
(1 of 5 Drawing Sheet(s) Filed in Color)

100

A wound image database is obtained — 110

A reference image-labeling step is performed — 120

A reference image pre-processing step is performed — 130

A model training step is performed — 140

WOUND GRADE ASSESSMENT METHOD

RELATED APPLICATIONS

This application claims priority to Taiwan Application Serial Number 111116118, filed Apr. 28, 2022, which is herein incorporated by reference.

BACKGROUND

Technical Field

The present disclosure relates to a medical information analysis method and a system thereof. More particularly, the present disclosure relates to an establishing method of wound grade assessment model, a wound care assessment system and a wound grade assessment method.

Description of Related Art

In clinical, the scope of wound therapy includes the treatment of acute trauma, the chronic wound care, the care of diabetic foot and the treatment of cancer wounds. If the wound is without complete care and treatment, a variety of serious complications may be induced, and it may even lead to the risk of death.

Take diabetes, the fifth leading cause of death in Taiwan, for example, diabetic patients are often with symptoms of vascular disease, resulting in difficult wound healing and repeated infection problems. In severe cases, there is even a risk of amputation. According to the statistics results, there is about 10-20% of the diabetic patients have the symptom of wound ulcer, and the risk of amputation thereof is 15 to 25 times higher than that of non-diabetic patients. Furthermore, nearly 50% of the diabetic patients may die within 5 years after amputation. However, when the wounds with highly complex is to be treated in clinical, it is necessary to base the assessment and diagnosis of the wound on the plastic surgeon first so as to grade the wound and propose appropriate treatment guidelines. Thus, it not only takes more time to make a diagnosis, but also may cause errors in the diagnosis results due to the subjective opinions of different plastic surgeons. Even more, the treatment thereof may be delayed.

Therefore, how to provide a method that can effectively grade the wound so as to provide complete care, has become a technical subject with clinical application value.

SUMMARY

According to one aspect of the present disclosure, an establishing method of wound grade assessment model, which is for establishing a wound grade assessment model, includes the following steps. A wound image database is provided, wherein the wound image database includes a plurality of reference wound image data, and each of the plurality of reference wound image data includes a wound medical information. A reference image-labeling step is performed, wherein a wound area of each of the plurality of reference wound image data is labeled based on a semantic segmentation method so as to obtain a plurality of labeled reference wound image data. A reference image pre-processing step is performed, wherein the plurality of labeled reference wound image data are respectively trained by a convolutional neural network classifier so as to obtain a plurality of reference wound contour features and a plurality of reference wound color features, and then the plurality of reference wound contour features and the plurality of reference wound color features are trained by the convolutional neural network classifier so as to obtained a plurality of processed reference wound image data. A model training step is performed, wherein the plurality of processed reference wound image data are trained to achieve a convergence by a deep-learning classifier so as to obtain the wound grade assessment model, and the wound grade assessment model is for assessing a pressure injury stage and a wound bed preparation indicator of a wound.

According to another aspect of the present disclosure, a wound care assessment system includes an image capturing device and a processor. The image capturing device is for capturing a target wound image data of a subject. The processor is signally connected to the image capturing device and includes an image-labeling module, a pre-processing module and a wound grade assessment model. The image-labeling module is for receiving and analyzing the target wound image data output from the image capturing device. The pre-processing module is signally connected to the image-labeling module. The wound grade assessment model is established by the establishing method of wound grade assessment model of the aforementioned aspect, and the wound grade assessment model is signally connected to the pre-processing module. The wound grade assessment model is for assessing a pressure injury stage and a wound bed preparation indicator of a wound of the subject corresponding to the target wound image data.

According to further another aspect of the present disclosure, a wound grade assessment method includes the following steps. The wound care assessment system of the aforementioned aspect is provided. The target wound image data of the subject is obtained, wherein the wound of the subject is photographed by the image capturing device so as to obtain the target wound image data, and the target wound image data is transmitted to the processor. A target image-labeling step is performed, wherein a wound area of the target wound image data is labeled based on the semantic segmentation method by the image-labeling module so as to obtain a labeled target wound image data. A target image pre-processing step is performed, wherein the labeled target wound image data is trained by the pre-processing module so as to obtain a target wound contour feature and a target wound color feature, and then the target wound contour feature and the target wound color feature are trained by the pre-processing module so as to obtain a processed target wound image data. A first classifying step is performed, wherein the processed target wound image data is analyzed by the wound grade assessment model so as to output a pressure injury stage assessing result and a wound bed preparation indicator assessing result.

BRIEF DESCRIPTION OF THE DRAWINGS

The patent or application file contains at least one drawing executed in color. Copies of this patent or patent application publication with color drawing(s) will be provided by Office upon request and payment of the necessary fee. The present disclosure can be more fully understood by reading the following detailed description of the embodiment, with reference made to the accompanying drawings as follows.

DETAILED DESCRIPTION

The present disclosure will be further exemplified by the following specific embodiments to facilitate utilizing and practicing the present disclosure completely by the people skilled in the art without over-interpreting and over-experimenting. However, these practical details are used to describe how to implement the materials and methods of the present disclosure and are not necessary.

[Establishing Method of Wound Grade Assessment Model of the Present Disclosure]

Figure 1:
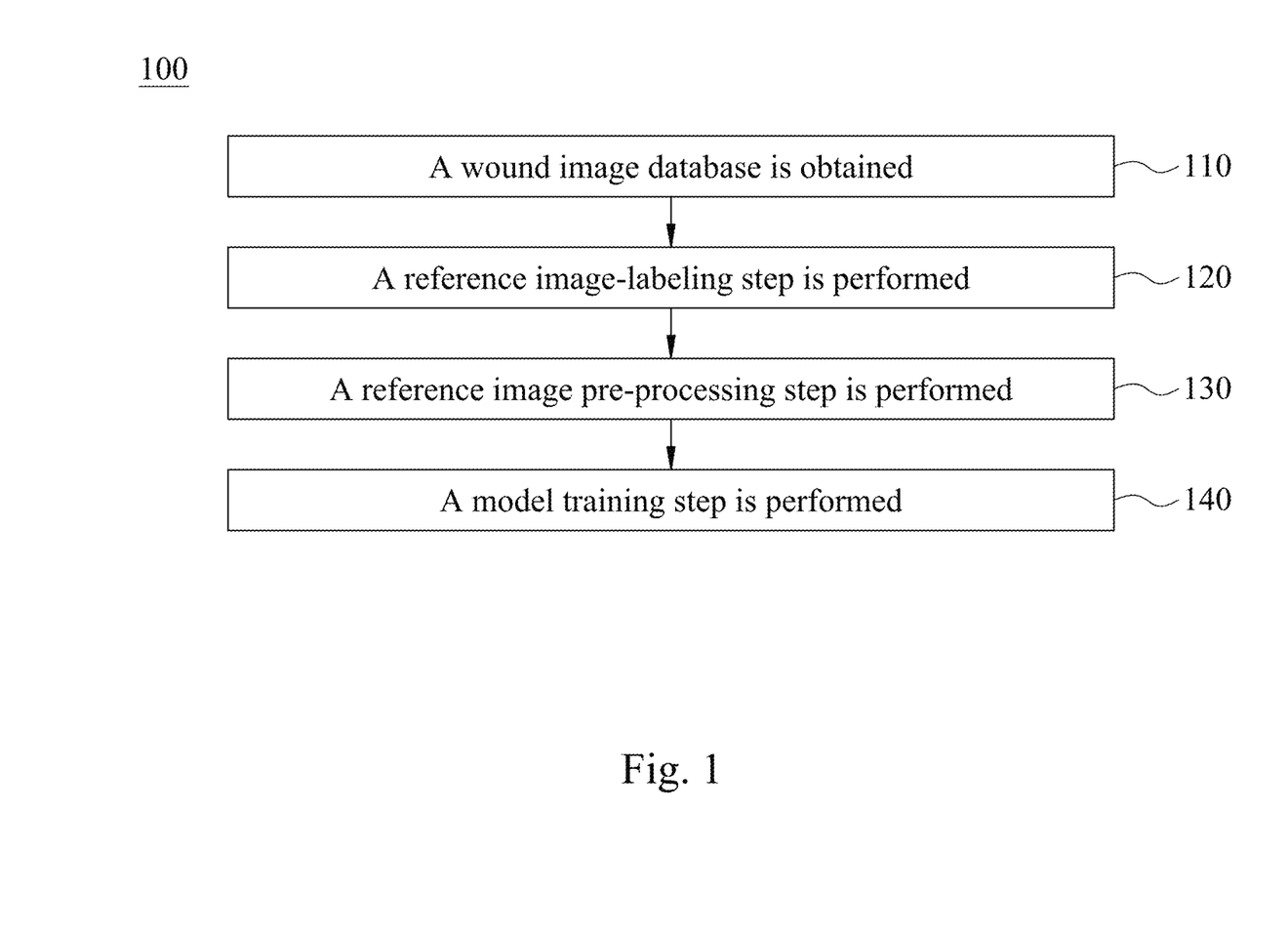
FIG. 1 is a flow chart of an establishing method of wound grade assessment model according to one embodiment of the present disclosure.

Reference is made by FIG. 1, which is a flow chart of an establishing method 100 of wound grade assessment model according to one embodiment of the present disclosure. The establishing method 100 of wound grade assessment model is for establishing a wound grade assessment model, and the establishing method 100 of wound grade assessment model includes Step 110, Step 120, Step 130 and Step 140.

In Step 110, a wound image database is obtained, wherein the wound image database includes a plurality of reference wound image data, and each of the plurality of reference wound image data includes a wound medical information. In detail, the reference wound image data can be the images of chronic wounds or bedsores on the body of a person who is with chronically ill or chronically bedridden, and the wound medical information can include a wound distribution information, a wound size information or a wound grading information assessed by a plastic surgeon or other professionals.

In Step 120, a reference image-labeling step is performed, wherein a wound area of each of the plurality of reference wound image data is labeled based on a semantic segmentation method so as to obtain a plurality of labeled reference wound image data. In detail, the semantic segmentation method is to classify all pixels in an image so as to identify the content elements presented in the image and the locations thereof. Thus, by labeling the reference wound image data based on the semantic segmentation method, the establishing method 100 of wound grade assessment model of the present disclosure can distinguish the wound site of the plurality of reference wound image data, and then the wound site can be separated from the background and other irrelevant images before training, so that the accuracy of following analysis can be increased.

In Step 130, a reference image pre-processing step is performed, wherein the plurality of labeled reference wound image data are respectively trained by a convolutional neural network classifier so as to obtain a plurality of reference wound contour features and a plurality of reference wound color features, and then the plurality of reference wound contour features and the plurality of reference wound color features are trained by the convolutional neural network classifier so as to obtained a plurality of processed reference wound image data. In detail, the convolutional neural network classifier can be a U-net convolutional neural network classifier or other classifiers with the autoencoder function. Thus, the plurality of reference wound contour features and the plurality of reference wound color features of the plurality of labeled reference wound image data can be extracted by the encoder of the convolutional neural network classifier, and then the decoder in the second half of the convolutional neural network classifier will reconstruct the plurality of reference wound contour features and the plurality of reference wound color features with high-dimensional into the plurality of processed reference wound image data by a deconvolution method. Furthermore, each of the plurality of processed reference wound image data can be a wound masking image data so as to provide for the following training of the model.

In Step 140, a model training step is performed, wherein the plurality of processed reference wound image data are trained to achieve a convergence by a deep-learning classifier so as to obtain the wound grade assessment model. In detail, the deep-learning classifier can be a VGG deep-learning classifier, a MobileNet deep-learning classifier or a Resnet deep-learning classifier, and the wound grade assessment model is for assessing a pressure injury stage and a wound bed preparation indicator of a wound.

In particular, the pressure injury referred to in the present disclosure is also known as a bedsore or a pressure ulcer, and the pressure injury are caused by the continuous pressure applied to the skin and the soft tissue beneath thereof, resulting in localized breakages of the skin and of the soft tissue. In the current clinical diagnosis, the pressure injury stage can be graded into six types based on the degrees of damage, and the details of the six types are shown in Table 1.

TABLE 1

| | |
|---|---|
| Stage 1 pressure injury | Intact skin with a localized area of non-blanchable erythema. |
| Stage 2 pressure injury | Partial-thickness loss of skin with exposed dermis. Adipose (fat) is not visible, and deeper tissues are not visible. |
| Stage 3 pressure injury | Full-thickness loss of skin, in which adipose is visible in the ulcer. |
| Stage 4 pressure injury | Full-thickness skin and tissue loss with exposed or directly palpable fascia, muscle, tendon, ligament, cartilage or bone in the ulcer. |
| Unstageable pressure injury | Full-thickness skin and tissue loss in which the extent of tissue damage within the ulcer cannot be confirmed because it is obscured by slough or eschar. |
| Deep tissue pressure injury | Intact or non-intact skin with localized area of persistent non-blanchable deep red, maroon, purple discoloration or epidermal separation revealing a dark wound bed or blood filled blister. |

Furthermore, the wound bed preparation indicator of the present disclosure is the "T.I.M.E.R.S. wound bed preparation", which is the advanced grading index of the wound bed preparation "T.I.M.E." proposed by Schultz and other European wound care experts in 2003, wherein the indicator "T." (Tissue management) is to assess whether the tissue is non-viable or deficient or not; the indicator "I." (Infection/Inflammation) is to assess whether the wound is infected or inflamed or not; the indicator "M." (Moisture imbalance) is to assess the moisture of the wound; the indicator "E." (Wound edge) is an assessing result of the edge of the wound; the indicator "R." (Repair/Regeneration) is an assessing result of the repair/regeneration condition of the wound; and the indicator "S." (Social) is an assessing result of the influence of the socialization factors on the wound of the subject. When the wound is well controlled in all of the aforementioned six indicators, the wound will have a great chance to heal.

Therefore, in the establishing method 100 of wound grade assessment model of the present disclosure, by the methods that the plurality of reference wound image data are labeled based on the semantic segmentation method, then the plurality of labeled reference wound image data obtained therefrom are processed based on the deconvolution method by the convolutional neural network classifier, and the plurality of processed reference wound image data are trained to achieve the convergence by the deep-learning classifier so as to obtain the wound grade assessment model, the wound grade assessment model of the present disclosure can effectively assess the pressure injury stage and the wound bed preparation indicator of the wound based on the image data thereof. Thus, it is favorable for rapidly and immediately providing the front-line medical personnel with the correct information of wound grading, so that the aims of early diagnosis and treatment can be achieved and the risk of various complications can be reduced, and has excellent clinical application potential.

[The Wound Care Assessment System of the Present Disclosure]

Figure 2:
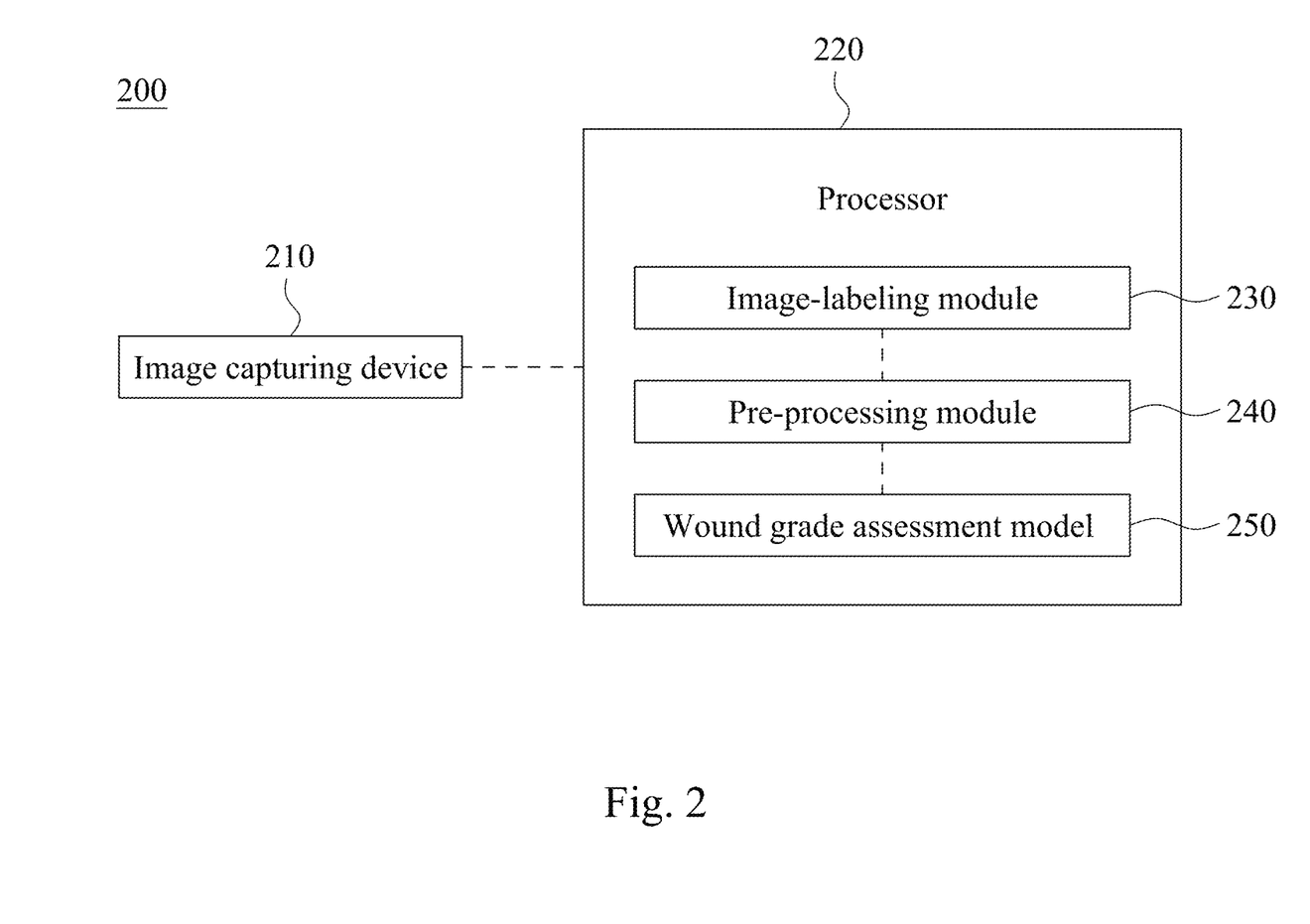
FIG. 2 is a block diagram of a wound care assessment system according to another embodiment of the present disclosure.

Reference is made by FIG. 2, which is a block diagram of a wound care assessment system 200 according to another embodiment of the present disclosure. The wound care assessment system 200 includes an image capturing device 210 and a processor 220.

The image capturing device 210 is for capturing a target wound image data of a subject. In detail, the image capturing device 210 can be an imaging device which can be used to capture the target wound image data, and the target wound image data is an image of chronic wounds or bedsores which is to be assessed.

The processor 220 is signally connected to the image capturing device 210. The processor 220 can be connected to the image capturing device 210 wirelessly or by a cable, but the present disclosure is not limited thereto. Further, the processor 220 includes an image-labeling module 230, a pre-processing module 240 and a wound grade assessment model 250.

The image-labeling module 230 is for receiving and analyzing the target wound image data output from the image capturing device 210.

The pre-processing module 240 is signally connected to the image-labeling module 230.

The wound grade assessment model 250 is signally connected to the pre-processing module 240. In particular, the wound grade assessment model 250 is established by the establishing method of wound grade assessment model of the present disclosure, and the wound care assessment system 200 is for assessing a pressure injury stage and a wound bed preparation indicator of a wound of the subject corresponding to the target wound image data.

[The Wound Grade Assessment Method of the Present Disclosure]

Figure 3:
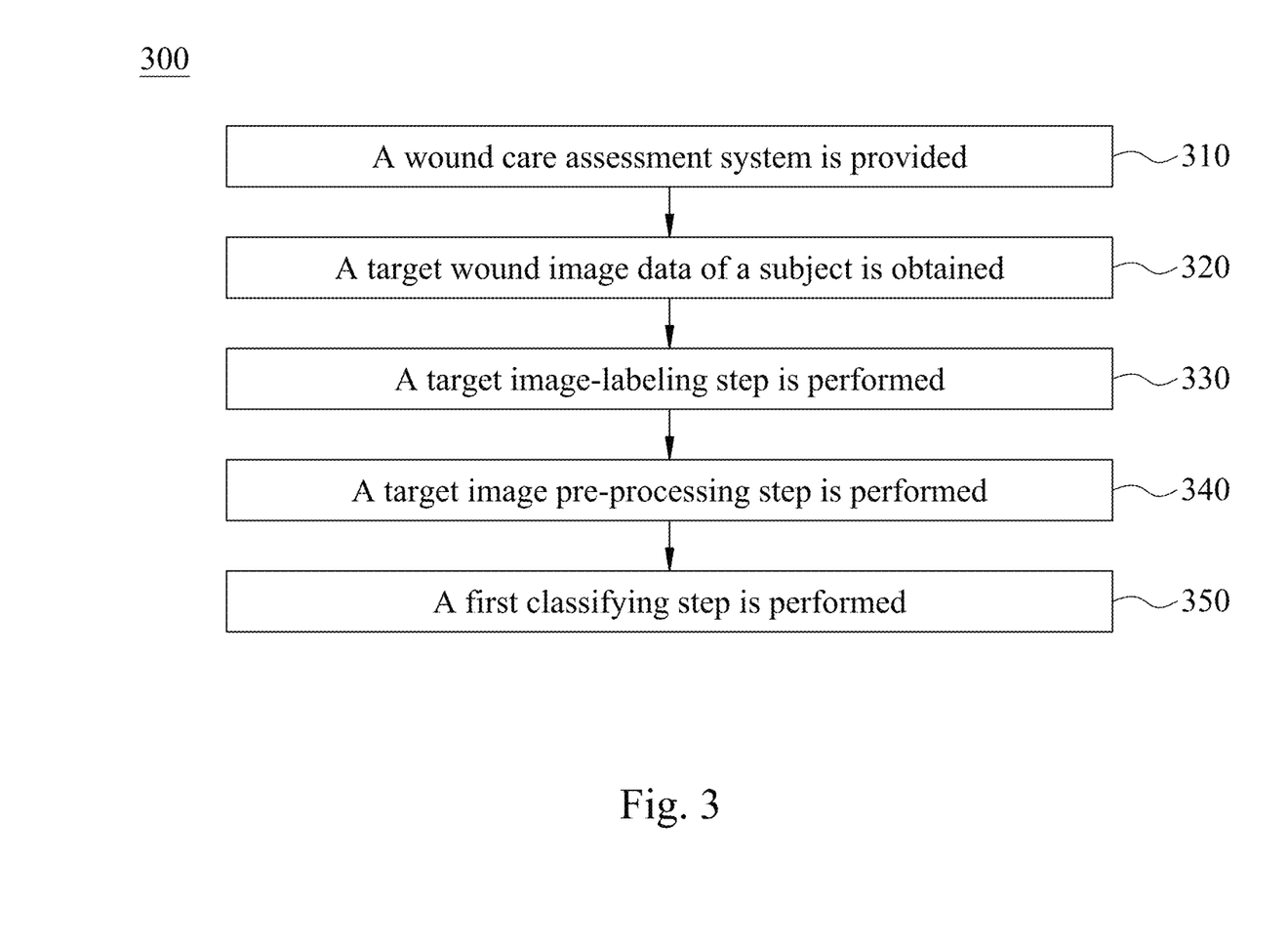
FIG. 3 is a flow chart of a wound grade assessment method according to further another embodiment of the present disclosure.

Reference is made by FIG. 2 and FIG. 3 simultaneously, wherein FIG. 3 is a flow chart of a wound grade assessment method 300 according to further another embodiment of the present disclosure. The wound grade assessment method 300 includes Step 310, Step 320, Step 330, Step 340 and Step 350, and the details and the steps of the wound grade assessment method 300 of the present disclosure will be illustrated along with the wound care assessment system 200 of FIG. 2.

In Step 310, the wound care assessment system 200 is provided.

In Step 320, the target wound image data of the subject is obtained, wherein the wound of the subject is photographed by the image capturing device 210 so as to obtain the target wound image data, and the target wound image data is transmitted to the processor 220 for the following analysis.

In Step 330, a target image-labeling step is performed, wherein a wound area of the target wound image data is labeled based on the semantic segmentation method by the image-labeling module 230 so as to obtain a labeled target wound image data. Thus, the accuracy of the following analysis can be increased.

In Step 340, a target image pre-processing step is performed, wherein the labeled target wound image data is trained by the pre-processing module 240 so as to obtain a target wound contour feature and a target wound color feature, and then the target wound contour feature and the target wound color feature are trained by the pre-processing module 240 so as to obtain a processed target wound image data. In detail, the pre-processing module 240 includes a U-net convolutional neural network classifier, and the labeled target wound image data is trained by the U-net convolutional neural network classifier in the target image pre-processing step so as to obtain the processed target wound image data, wherein the processed target wound image data can be a wound masking image data.

In Step 350, a first classifying step is performed, wherein the processed target wound image data is analyzed by the wound grade assessment model 250 so as to output a pressure injury stage assessing result and a wound bed preparation indicator assessing result. The pressure injury stage assessing result includes a pressure injury of stage 1, a pressure injury of stage 2 to stage 4, an unstageable pressure injury and a deep tissue pressure injury, and the wound bed preparation indicator assessing result includes six wound bed preparation indicators, namely the indicator "T.", the indicator "I.", the indicator "M.", the indicator "E.", the indicator "R." and the indicator "S.".

Therefore, by analyzing the target wound image data of the subject, the wound care assessment system 200 and the wound grade assessment method 300 of the present disclosure can assess the pressure injury stage and the wound bed preparation indicator of the wound of the subject based on the information of the target wound image data. Thus, it is favorable for planning the following medical treatment in advance so as to reduce the probability of complications caused by the wound that is not treated immediately or treated improperly.

Figure 4:
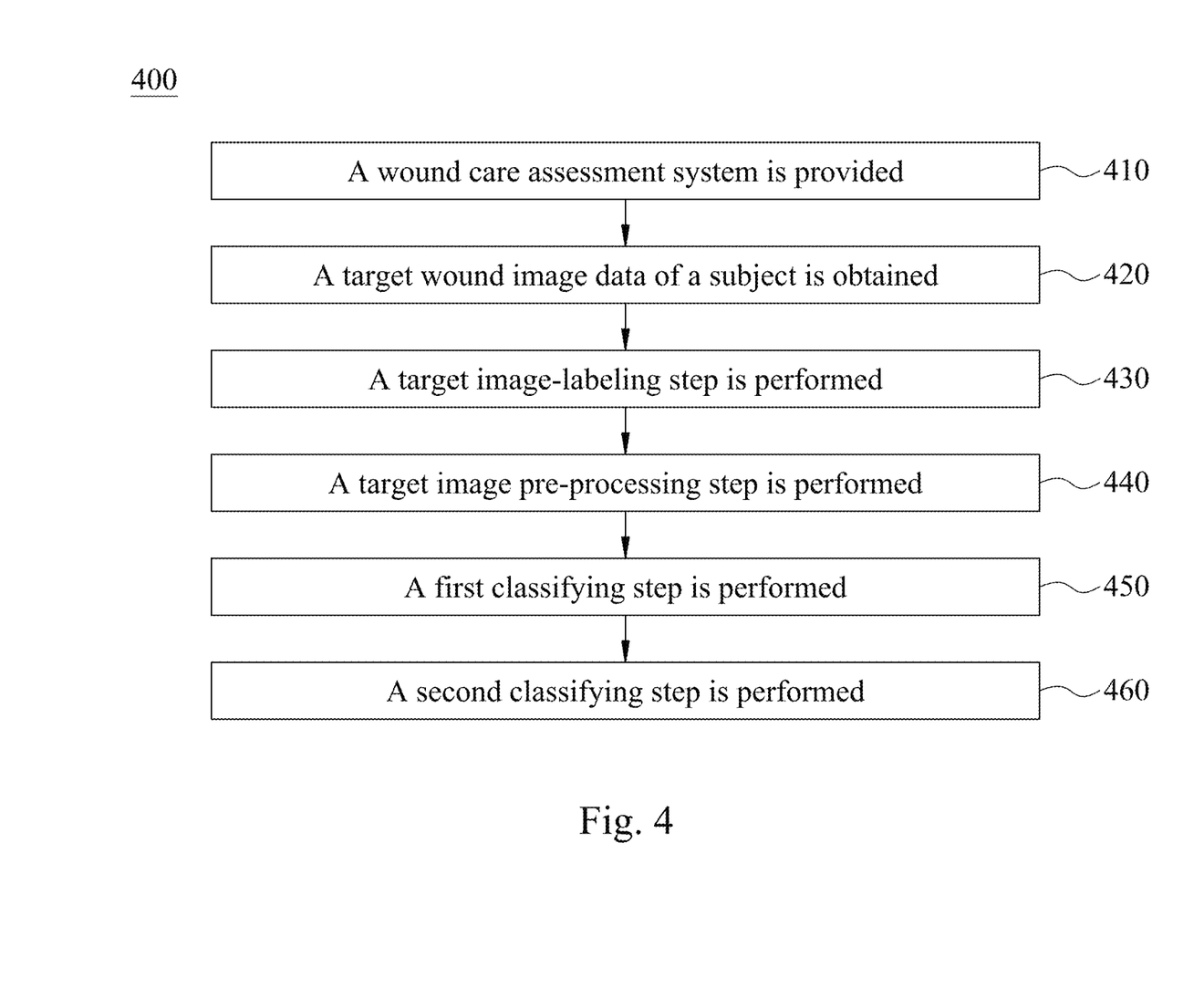
FIG. 4 is a flow chart of another wound grade assessment method according to further another embodiment of the present disclosure.

Reference is made by FIG. 2 and FIG. 4 simultaneously, wherein FIG. 4 is a flow chart of another wound grade assessment method 400 according to further another embodiment of the present disclosure. The wound grade assessment method 400 includes Step 410, Step 420, Step 430, Step 440, Step 450 and Step 460, wherein Step 410, Step 420, Step 430, Step 440 and Step 450 are the same as the Step 310, Step 320, Step 330, Step 340 and Step 350 of FIG. 3, so that the same details thereof are not described therein again.

In Step 460, a second classifying step is performed, wherein the processed target wound image data is analyzed by the wound grade assessment model 250 for a secondary assessment so as to output a secondary pressure injury stage assessing result. In particular, the appearance of the pressure injuries of Stage 2, Stage 3 and Stage 4 are very similar and difficult to distinguish from each other in clinical. Accordingly, when the target wound image data of the subject is graded into the pressure injury of stage 2 to stage 4, the wound grade assessment method 400 will further analyze the processed target wound image data by the wound grade assessment model 250 so as to distinguish that the target wound image data is a pressure injury of stage 2, a pressure injury of stage 3 or a pressure injury of stage 4. Thus, the pressure injury stage of the wound can be assessed more accurately, so that it is favorable for planning the following medical treatment in advance so as to prevent the health of the subject from being affected by the deterioration of the wound.

The efficacy used to assess the pressure injury stage and the wound bed preparation indicator of the wound grade assessment model established by the establishing method of wound grade assessment model, the wound care assessment system and the wound grade assessment method of the present disclosure will be further exemplified by the following specific examples.

Example 1

Example 1 is performed by the wound image database 1. The wound image database 1 includes 617 groups of retrospective wound imaging data, and each of the groups includes a wound image, and a wound size information, a wound distribution information, a pressure injury stage and a labeling result of T.I.M.E.R.S. assessed by a plastic surgeon or other professionals corresponding thereto are also included. After removing the wound image data that the wound area is too small and the wound image is blurred, a total of 575 groups of effective wound image data are obtained. In Example 1, the pressure injury stages of the 575 groups of wound imaging data are shown in Table 2, and the T.I.M.E.R.S. labeling of the 575 groups of wound imaging data are shown in Table 3.

TABLE 2

|  | Stage 1 | Stage 2 | Stage 3 | Stage 4 | Unstageable | Deep tissue |
|---|---|---|---|---|---|---|
| Number | 17 | 73 | 221 | 58 | 106 | 100 |

TABLE 3

|  | T. | I. | M. | E. | R. | S. |
|---|---|---|---|---|---|---|
| No | 273 | 541 | 491 | 331 | 305 | 186 |
| Yes | 302 | 34 | 84 | 244 | 270 | 389 |

In the experiment, the 575 groups of wound imaging data of the wound image database 1 are divided into 5 major groups, wherein 4 of them (460 groups) are used as training sets, the other one (115 groups) is used as a validation set, and a wound grade assessment model is established by the establishing method of wound grade assessment model of the present disclosure based on the wound imaging data of the wound image database 1. In detail, the reference image pre-processing step is performed by the U-net convolutional neural network classifier in Example 1, the wound grade assessment model is established by the VGG 11_bn deep-learning classifier, and then the established wound care assessment system of the wound grade assessment model and the wound grade assessment method are used to the following test.

Figure 5:
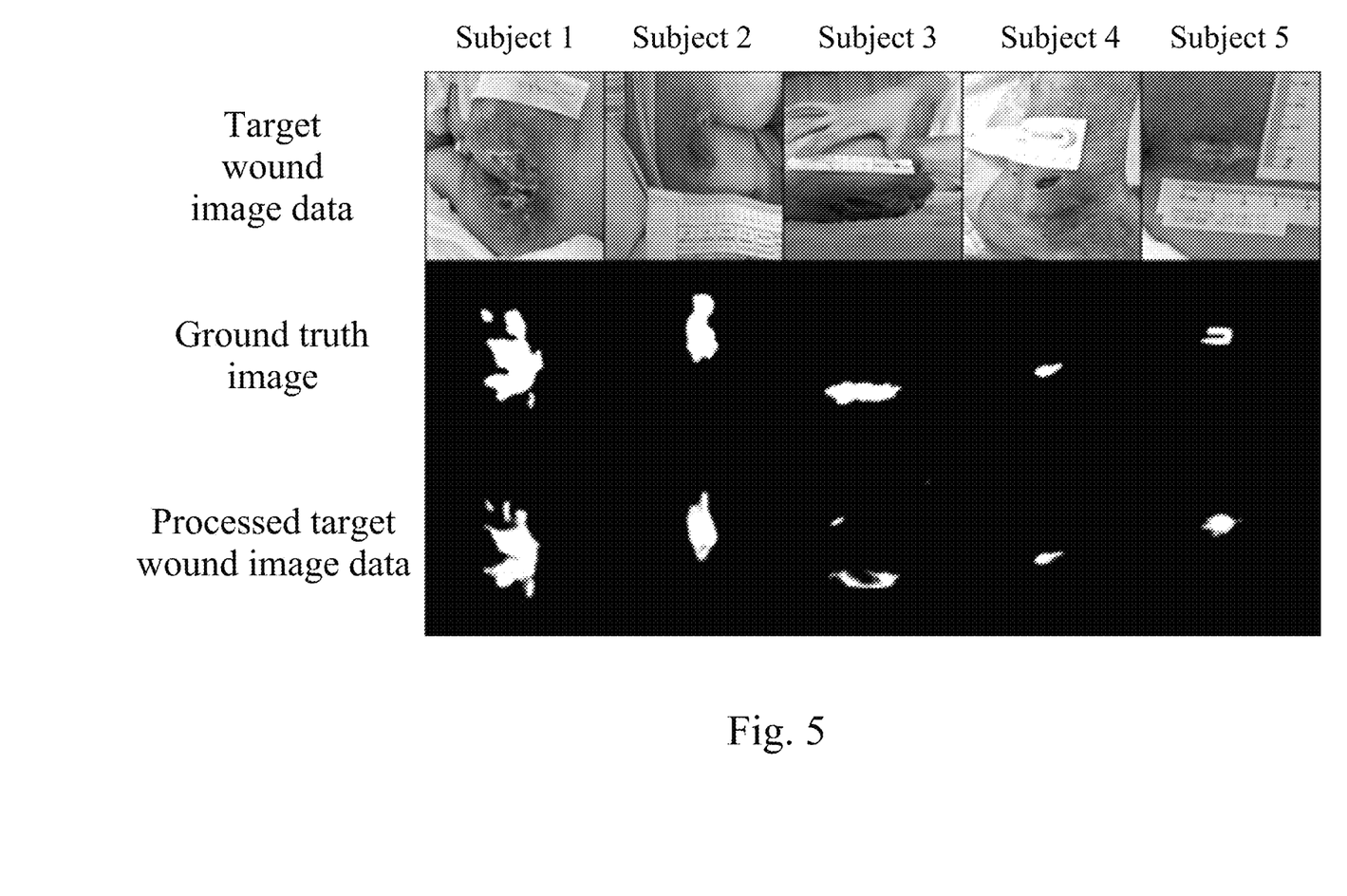
FIG. 5 shows performance results of wound labeling of a wound care assessment system and a wound grade assessment method of Example 1 for the target wound image data of different subjects.

Reference is made by FIG. 5, which shows performance results of wound labeling of the wound care assessment system and the wound grade assessment method of Example 1 for the target wound image data of different subjects. As shown in FIG. 5, take 5 of the subjects of the 575 groups of wound imaging data for example, the processed target wound image data of Subject 1 to Subject 5 are very similar to the ground truth images assessed by physicians, and all of the ground truth images as well as the processed target wound image data truly reflect the distribution and contour of the wound in the target wound image. Furthermore, after analyzing with the Dice coefficient analysis method, the consistency between the processed reference wound image data output from the wound grade assessment model of Example 1 and the labeling results of clinical experts in the training set can reach 90%, and the consistency within the validation sets can also reach 80%.

Reference is made by Table 4, which shows the results of the Dice coefficient analysis method of the wound care assessment system and the wound grade assessment method of Example 1 for assessing the pressure injury stage. As shown in Table 4, the consistency of Example 1 for assessing the pressure injury stage can reach at least 0.57±0.21 (about 57%) or more, and the highest can be 0.90±0.11 (about 90%).

TABLE 4

|  | Stage 1 | Stage 2 | Stage 3 | Stage 4 | Unstageable | Deep tissue |
|---|---|---|---|---|---|---|
| Dice coeff. | 0.57 ± 0.21 | 0.62 ± 0.30 | 0.75 ± 0.24 | 0.90 ± 0.11 | 0.67 ± 0.22 | 0.77 ± 0.29 |

Furthermore, the performance of the wound care assessment system and the wound grade assessment method of Example 1 for assessing the indicator "T." of the wound bed preparation indicator is excellent, wherein the accuracy thereof is 83.78%, the sensitivity is 83.88%, the specificity is 84.21%, and the AUROC is up to 82.16%.

Example 2

Example 2 is performed by the wound image database 2. The wound image database 2 includes 1269 groups of retrospective wound imaging data, and each of the groups includes a wound image, and a wound size information, a wound distribution information, a pressure injury stage and a labeling result of T.I.M.E.R.S. assessed by a plastic surgeon or other professionals corresponding thereto are also included. In Example 2, the pressure injury stages of the 1269 groups of wound imaging data are shown in Table 5, and the T.I.M.E.R.S. labeling thereof are shown in Table 6.

TABLE 5

|  | Stage 1 | Stage 2 | Stage 3 | Stage 4 | Unstageable | Deep tissue |
|---|---|---|---|---|---|---|
| Number | 125 | 152 | 433 | 141 | 216 | 202 |

TABLE 6

|  | T. | I. | M. | E. | R. | S. |
|---|---|---|---|---|---|---|
| No | 583 | 1121 | 1053 | 719 | 736 | 607 |
| Yes | 686 | 148 | 216 | 550 | 533 | 662 |

In the experiment, the 1269 groups of wound imaging data of the wound image database 2 are divided into 5 major groups, wherein 4 of them (1013 groups) are used as training sets, the other one (256 groups) is used as a validation set, and a wound grade assessment model is established by the establishing method of wound grade assessment model of the present disclosure. In detail, the reference image pre-processing step is performed by the U-net convolutional neural network classifier in Example 2, the wound grade assessment model is established by the MobileNet deep-learning classifier, and then the established wound care assessment system of the wound grade assessment model and the wound grade assessment method are used to the following test.

Reference is made by Table 7, which shows the results of the performance for labeling the wound contour by the wound care assessment system and the wound grade assessment method of Example 2. As shown in Table 7, the consistency of Example 2 between the performance of assessing the labeling of wound contour and the labeling results of clinical experts can reach more than 0.74 (74%) in different pressure injury stages, and the overall assessing performance within the validation set can reach 0.806 (80.6%).

TABLE 7

|      | Stage 1 | Stage 2 | Stage 3 | Stage 4 | Unstageable | Deep tissue |
|------|---------|---------|---------|---------|-------------|-------------|
| Dice | 0.792   | 0.746   | 0.767   | 0.936   | 0.888       | 0.762       |
| Std. | 0.235   | 0.172   | 0.256   | 0.045   | 0.133       | 0.206       |

Reference is made by Table 8, which shows the results of the wound care assessment system and the wound grade assessment method of Example 2 for assessing the indicators "T.", "I.", "M." and "E." of the wound bed preparation indicator. As shown in Table 8, the accuracy, the specificity, the recall value and the F1-score of the wound care assessment system and the wound grade assessment method of Example 2 for assessing the indicator "T." of the wound bed preparation indicator are excellent and can reach more than 0.84, and the accuracy and the precision for assessing the indicators "M." and "E." are also excellent.

TABLE 8

|    | Accuracy | Precision | Recall | F1-score |
|----|----------|-----------|--------|----------|
| T. | 0.8498   | 0.86      | 0.86   | 0.86     |
| I. | 0.47     | 0.11      | 0.48   | 0.17     |
| M. | 0.8893   | 0.83      | 0.44   | 0.58     |
| E. | 0.7905   | 0.83      | 0.65   | 0.73     |

Reference is made by Table 9 and Table 10, wherein Table 9 shows the results of the wound care assessment system and the wound grade assessment method of Example 2 for assessing the pressure injury stage, and Table 10 shows the results of the wound care assessment system and the wound grade assessment method of Example 2 for the secondary assessment of the pressure injury stage.

TABLE 9

| Pressure injury stage | Precision | Recall | F1-score |
|-----------------------|-----------|--------|----------|
| Stage 1               | 0.81      | 0.84   | 0.82     |
| Stage 2 to Stage 4    | 0.87      | 0.92   | 0.89     |
| Unstageable           | 0.70      | 0.63   | 0.67     |
| Deep tissue           | 0.92      | 0.77   | 0.84     |

TABLE 9-continued

| Pressure injury stage | Precision | Recall | F1-score |
|-----------------------|-----------|--------|----------|
| Accuracy              | —         | —      | 0.84     |
| Average weight        | 0.84      | 0.84   | 0.84     |

TABLE 10

| Pressure injury stage | Precision | Recall | F1-score |
|-----------------------|-----------|--------|----------|
| Stage 2               | 0.71      | 0.5    | 0.59     |
| Stage 3               | 0.75      | 0.91   | 0.82     |
| Stage 4               | 0.90      | 0.62   | 0.73     |
| Accuracy              | —         | —      | 0.77     |
| Average weight        | 0.77      | 0.77   | 0.76     |

As shown in Table 9, the wound imaging data of the wound image database 2 are analyzed and processed by the wound care assessment system and the wound grade assessment method of Example 2 and then output a pressure injury stage assessing result, wherein the pressure injury stage assessing result includes a pressure injury of stage 1, a pressure injury of stage 2 to stage 4, an unstageable pressure injury and a deep tissue pressure injury, and the precision, the recall value and the F1-score of the wound care assessment system and the wound grade assessment method of Example 2 for assessing different stages of the pressure injury stage are excellent and can reach more than 0.6.

Furthermore, the appearance of the pressure injuries of Stage 2, Stage 3 and Stage 4 are very similar and difficult to distinguish from each other in clinical. Thus, in the present experiment, the wound imaging data graded into the pressure injury of stage 2 to stage 4 will be further processed by the wound care assessment system and the wound grade assessment method of Example 2 by the secondary assessment. As shown in Table 10, after the secondary assessment by the wound care assessment system and the wound grade assessment method of Example 2, the said wound imaging data can be effectively and precisely graded into the pressure injury of Stage 2, the pressure injury of Stage 3 or the pressure injury of Stage 4, and the precision thereof can reach more than 0.7.

To sum up, the establishing method of wound grade assessment model, the wound grade assessment model established therefrom, the wound care assessment system including the wound grade assessment model and the wound grade assessment method of the present disclosure can accurately assess the pressure injury stage and the wound bed preparation indicator of the wound based on the target wound image data of the subject. Thus, it is favorable for rapidly and immediately providing the front-line medical personnel with the correct information of wound grading, so that the aims of early diagnosis and treatment can be achieved and the risk of various complications can be reduced.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A wound grade assessment method, comprising:
providing a wound care assessment system, and the wound care assessment system comprising:
an image capturing device for capturing a target wound image data of a subject; and
a processor signally connected to the image capturing device and comprising:
an image-labeling module for receiving and analyzing the target wound image data output from the image capturing device;
a pre-processing module signally connected to the image-labeling module; and
a wound grade assessment model established by an establishing method of wound grade assessment model, and the wound grade assessment model signally connected to the pre-processing module;
obtaining the target wound image data of the subject, wherein the wound of the subject is photographed by the image capturing device so as to obtain the target wound image data, and the target wound image data is transmitted to the processor;
performing a target image-labeling step, wherein a wound area of the target wound image data is labeled based on a semantic segmentation method by the image-labeling module so as to obtain a labeled target wound image data;
performing a target image pre-processing step, wherein the labeled target wound image data is trained by the pre-processing module so as to obtain a target wound contour feature and a target wound color feature, and then the target wound contour feature and the target wound color feature are trained by the pre-processing module so as to obtain a processed target wound image data; and
performing a first classifying step, wherein the processed target wound image data is analyzed by the wound grade assessment model so as to output a pressure injury stage assessing result and a wound bed preparation indicator assessing result;
wherein the establishing method of wound grade assessment model comprises:
obtaining a wound image database, wherein the wound image database comprises a plurality of reference wound image data, and each of the plurality of reference wound image data comprises a wound medical information;
performing a reference image-labeling step, wherein a wound area of each of the plurality of reference wound image data is labeled based on the semantic segmentation method so as to obtain a plurality of labeled reference wound image data;
performing a reference image pre-processing step, wherein the plurality of labeled reference wound image data are respectively trained by a convolutional neural network classifier so as to obtain a plurality of reference wound contour features and a plurality of reference wound color features, and then the plurality of reference wound contour features and the plurality of reference wound color features are trained by the convolutional neural network classifier so as to obtained a plurality of processed reference wound image data; and
performing a model training step, wherein the plurality of processed reference wound image data are trained to achieve a convergence by a deep-learning classifier so as to obtain the wound grade assessment model.

2. The wound grade assessment method of claim 1, wherein the pre-processing module comprises a U-net convolutional neural network classifier, and the labeled target wound image data is trained by the U-net convolutional neural network classifier in the target image pre-processing step so as to obtain the processed target wound image data.

3. The wound grade assessment method of claim 1, wherein the processed target wound image data is a wound masking image data.

4. The wound grade assessment method of claim 1, wherein the pressure injury stage assessing result comprises a pressure injury of stage 1, a pressure injury of stage 2 to stage 4, an unstageable pressure injury and a deep tissue pressure injury.

5. The wound grade assessment method of claim 4, wherein when the target wound image data of the subject is graded into the pressure injury of stage 2 to stage 4, the wound grade assessment method further comprises:
performing a second classifying step, wherein the processed target wound image data is analyzed by the wound grade assessment model for a secondary assessment so as to output a secondary pressure injury stage assessing result, and the secondary pressure injury stage assessing result comprises a pressure injury of stage 2, a pressure injury of stage 3 and a pressure injury of stage 4.

6. The wound grade assessment method of claim 1, wherein the deep-learning classifier is a VGG deep-learning classifier, a MobileNet deep-learning classifier or a Resnet deep-learning classifier.

* * * * *